Sept. 12, 1961   W. R. NORTHUP ET AL   2,999,331
FISHING LURES
Filed April 7, 1959

WILMER R. NORTHUP
THOMAS W. KAYLOR
INVENTORS

BY James D. Gurnan
ATT'Y

2,999,331
FISHING LURES
Wilmer R. Northup, Box 412, and Thomas W. Kaylor, 2111 Greenwood Ave., both of Reedsport, Oreg.
Filed Apr. 7, 1959, Ser. No. 804,716
1 Claim. (Cl. 43—42.46)

This invention relates to improvements in fishing lures especially designed for trolling and of such design and maneuverability as to simulate the actions of a crippled pilchard.

The principal object of the invention is to provide a lure of the character described having a head portion, body portion and tail portion and wherein the head portion is so designed as to render the lure capable of functioning at various depths in a pitching motion determined by its speed of travel through the water and/or the weight of the payed out trolling line to which the lure is attached, and from side to side in a rocking motion augmented by a dorsal fin carried by the body portion and canted diagonally relative to the longitudinal axis thereof.

Another object of the invention is to provide a lure of this character wherein the simulating body, after a fish strikes and is hooked, will swing upwardly away from the hook element into a position where its resistance to free movement in the water will be of no assistance to the fish in its attempts to tear or release the hook element from its mouth.

The foregoing and other objects and advantages which will become subsequently apparent reside in the details of construction and operation as more fully hereinafter described and claimed, reference being had to the accompanying drawing forming a part hereof and in which:

Figure 1:
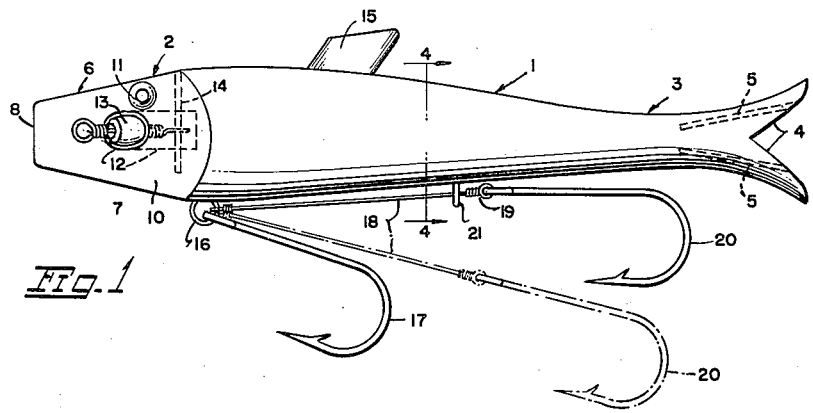
FIGURE 1 is a side elevational view of a fishing lure made in accordance with our invention.

With continuing reference to the drawing wherein like reference characters designate like parts, reference numeral 1 indicates generally the body portion of the lure; 2 the head portion thereof and 3 the tail portion having tail fins 4. The lure in its entirety is preferably made of relatively light weight material to aid in its buoyancy and if made of wood the tail fins are reinforced against splitting or breakage by dowel pins 5.

Figure 2:
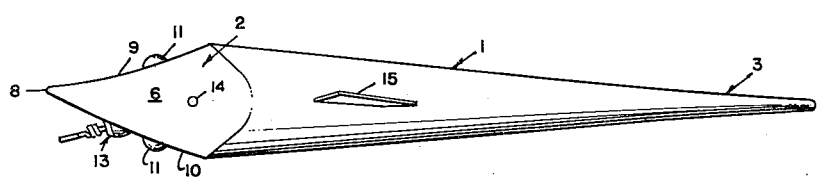
FIGURE 2 is a top plan view of FIGURE 1.

The flat top and bottom surfaces 6 and 7 respectively of the head portion are equal in area and taper forwardly and downwardly to the top and bottom ends of a vertical edge 8 offset from the longitudinal axis of the lure, and concave and convex side surfaces 9 and 10 respectively of the head portion converge to the edge 8 along curved lines as best shown in FIGURE 2 and are provided with artificial eyes 11.

The head portion 2 is provided with a forwardly opening bore 12 for the reception of a swivel 13 of the ordinary type whose rearward end is secured within the bore by a pin 14 and whose forward end is adapted for connection to a trolling line (not shown) in the usual manner.

A dorsal fin 15, preferably made of bendable metal, is secured to the body portion 1 with its bottom portion arranged diagonally relative to the longitudinal centerline of the lure as best shown in FIGURE 2.

A screw eye 16 is secured to the underside of the forward end of the body 1 for the permanent swingable attachment thereto of a single hook 17, as shown, or a gang hook if desired. Also permanently attached to the screw eye is the forward end of a leader 18 whose rearward end is secured as at 19 to a second hook 20 which may be a single or gang type.

A holding device indicated generally at 21 is spaced rearwardly from the screw eye 16, and comprises a single length of spring wire formed into two leg portions 22 and 23 driven into the body 1 of the lure, extended downwardly therefrom and convoluted into a downwardly opening spring clip 24 for normally holding the leader 18 in the position shown in the position shown in FIGURE 1. As the lure travels forwardly through the water the hooks will assume approximately the positions shown. When a fish strikes the first hook 17 the line of pull on the shank of the hook will be substantially coaxial with the trolling line to which the lure is attached.

When the second hook 20 is struck and set while in the full line position shown, the forward pull on the swivel 13 by the trolling line and the reaction of the leader 18 on the screw eye 16 located below the swivel will cause the lure body to fulcrum upwardly in a forward direction about the screw eye and the leader to become disengaged from the holding device 21 by the rearward pull of the hooked fish. Whereupon the hook 20 will be free to function in the ordinary manner. As a result of this action the lure as a whole will not, by its weight, leverage and its resistance to free movement in the water, afford any assistance to the fish in its subsequent struggle to tear the hook from its mouth.

Figure 3:
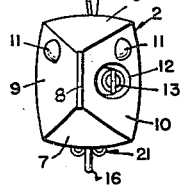
FIGURE 3 is a front elevational view of FIGURE 1.
Figure 3:
Figure 4:
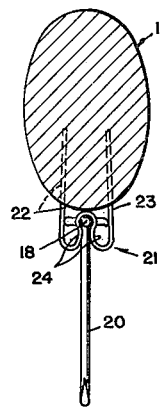
FIGURE 4 is a sectional end view on an enlarged scale taken approximately along the line 4—4 of Figure 1.
Figure 4:

As the lure is drawn through the water or is presented to a current, the action of the water on the flat top and bottom surfaces of the head will stabilize longitudinal movement of the lure and the unequal forces exerted on the convex and concave side surfaces 9 and 10 will cause the lure to momentarily dart to the left as viewed in FIGURE 3 and then to the right by the overpowering pull of the trolling line. During these oscillating antics a partial rolling motion will be imparted to the lure by the diagonally disposed dorsal fin 5 which because of its bendable nature can be set at various angles to regulate the extent of the rocking rolling motion.

While we have shown a particular form of embodiment of our invention, we are aware that many minor changes therein will readily suggest themselves to others skilled in the art without departing from the spirit and scope of the invention. Having thus described our invention what we claim as new and desire to protect by Letters Patent is:

A fishing lure comprising an elongated rigid body member, means attached to said body member rearward of its forward end for attachment to a trolling line, said body member having a head portion at its forward end and a tail portion at its opposite end including tail fins, a fin of bendable metal secured to the top surface of the body of the lure and arranged diagonally relative to the longitudinal center line of the lure, said head portion having side surfaces converging to a vertical edge, offset from the longitudinal axis of the lure and offset from said line attaching means, whereby the motion of the lure when moved through the water will simulate that of a crippled fish in that said offset vertical edge will cause the lure to swing to one side against the pull exerted by the trolling line and simultaneously said bendable fin will cause a rolling action of the lure and whereby the pull of the trolling line will return the lure to an upright position.

References Cited in the file of this patent
UNITED STATES PATENTS

| | | |
|---|---|---|
| 1,200,135 | Reynolds | Oct. 3, 1916 |
| 1,553,933 | Dills | Sept. 5, 1925 |
| 2,102,492 | Stolley | Dec. 14, 1937 |

(Other references on following page)

UNITED STATES PATENTS

| | | | |
|---|---|---|---|
| 2,110,382 | Martin | Mar. 8, | 1938 |
| 2,459,288 | Robbins et al. | Jan. 18, | 1949 |
| 2,547,103 | White | Apr. 3, | 1951 |
| 2,565,660 | Krilich | Aug. 28, | 1951 |
| 2,737,751 | Munsch | Mar. 13, | 1956 |
| 2,820,314 | Scott | Jan. 21, | 1958 |
| 2,855,719 | Moser | Oct. 14, | 1958 |
| 2,944,363 | Poe | July 12, | 1960 |